(12) United States Patent
David

(10) Patent No.: US 8,463,654 B1
(45) Date of Patent: Jun. 11, 2013

(54) TOUR SITE IMAGE CAPTURE AND MARKETING SYSTEM AND ASSOCIATED METHODS

(76) Inventor: Clifford R. David, Windermere, FL (US)

(*) Notice: Subject to any disclaimer, the term of this patent is extended or adjusted under 35 U.S.C. 154(b) by 420 days.

(21) Appl. No.: 12/772,275

(22) Filed: May 3, 2010

Related U.S. Application Data

(60) Provisional application No. 61/174,515, filed on May 1, 2009.

(51) Int. Cl.
*G06Q 30/00* (2012.01)

(52) U.S. Cl.
USPC .......................................... 705/26.1; 705/27.1

(58) Field of Classification Search
USPC ...................................... 705/26, 27
See application file for complete search history.

(56) References Cited

U.S. PATENT DOCUMENTS

| | | |
|---|---|---|
| 5,448,320 A | 9/1995 | Sakai et al. |
| 5,587,740 A | 12/1996 | Brennan |
| 5,606,365 A | 2/1997 | Maurinus et al. |
| 5,768,633 A | 6/1998 | Allen et al. |
| 6,222,646 B1 | 4/2001 | Maurinus et al. |
| 6,385,772 B1 | 5/2002 | Courtney |
| 6,417,913 B2 | 7/2002 | Tanaka |
| 6,532,345 B1 | 3/2003 | Gluck |
| 6,542,824 B1 | 4/2003 | Berstis |
| 6,545,708 B1 | 4/2003 | Tamayama et al. |
| 6,591,068 B1 | 7/2003 | Dietz |
| 6,628,899 B1 | 9/2003 | Kito |
| 6,698,943 B2 | 3/2004 | Gluck |
| 6,759,957 B2 | 7/2004 | Murakami et al. |
| 6,774,936 B1 | 8/2004 | Park |
| 6,856,346 B1 | 2/2005 | Kobayashi et al. |
| 7,077,581 B2 | 7/2006 | Gluck |
| 7,158,945 B1 | 1/2007 | Wolcott et al. |
| 7,283,687 B2 | 10/2007 | Bodin et al. |
| 7,301,558 B2 | 11/2007 | Gluck |
| 7,343,320 B1 | 3/2008 | Treyz et al. |

(Continued)

FOREIGN PATENT DOCUMENTS

| | | |
|---|---|---|
| JP | 2001-148822 | 5/2001 |
| JP | 2002-297753 | 11/2002 |
| JP | 2004-297191 | 10/2004 |

OTHER PUBLICATIONS

Gilmore et al., Customer Experience Places: The New Offering Frontier; Strategy & Leadership. Chicago: 2002. vol. 30, Iss. 4; p. 4; Retrieved from ProQuestDirect on the Internet on Nov. 29, 2010, 12 pages.

(Continued)

*Primary Examiner* — James Zurita
(74) *Attorney, Agent, or Firm* — Cooper & Dunham, LLP

(57) ABSTRACT

The present invention in one aspect is directed to a system and method for capturing a digital image, and preferably a collection of digital images, of a customer in a defined location, such as a museum, a garden, a zoo, a religious institution, a theme park, or any such site known in the art. The system and method provide a customer with a customized pictorial souvenir of a visit to the site. The souvenir can include other elements, such as "stock" images, alone or having had an image of the customer digitally inserted thereinto, and informational material. Embodiments are also provided that employ devices such as "smart," interactive devices and read only or read/write devices.

22 Claims, 8 Drawing Sheets

U.S. PATENT DOCUMENTS

| | | |
|---|---|---|
| 7,466,909 B2 | 12/2008 | Meininger |
| 7,607,843 B2 | 10/2009 | Gluck |
| 2002/0128934 A1 | 9/2002 | Shaer |
| 2003/0023452 A1 | 1/2003 | Novais et al. |
| 2003/0067543 A1 | 4/2003 | Okada et al. |
| 2003/0086123 A1 | 5/2003 | Torrens-Burton |
| 2004/0152486 A1 | 8/2004 | Sano |
| 2004/0189816 A1 | 9/2004 | Nakazawa et al. |
| 2004/0201683 A1 | 10/2004 | Murashita et al. |
| 2004/0201709 A1 | 10/2004 | McIntyre et al. |
| 2005/0091119 A1 | 4/2005 | Tuijn et al. |
| 2005/0117018 A1 | 6/2005 | Wolf |
| 2007/0003113 A1 | 1/2007 | Goldberg |
| 2008/0234049 A1* | 9/2008 | LeBlanc et al. .................. 463/42 |
| 2008/0251575 A1* | 10/2008 | Bowling et al. ................ 235/375 |
| 2009/0052736 A1* | 2/2009 | Kacker ......................... 382/100 |

OTHER PUBLICATIONS

Gilmore et al., Customer Experience Places: The New Offering Frontier; Strategy & Leadership. Chicago:2002. vol. 30, Iss. 4; p. 4: Retrieved from ProQuestDirect on the Internet on Nov. 29, 2012, 12 pages.

Picture Your Perfect Camera, Derrick Story. Macworld. San Francisco: Jan. 2005. vol. 22, Iss.1; p. 60, download from ProQuestDirect on the Internet on Apr. 23, 2012.

* cited by examiner

TOUR SITE IMAGE CAPTURE AND MARKETING SYSTEM AND ASSOCIATED METHODS

CROSS-REFERENCE TO RELATED APPLICATION

This application claims priority to provisional patent application Ser. No. 61/174,515, filed May 1, 2009, and Ser. No. 61/293,035, filed Jan. 7, 2010.

TECHNICAL FIELD

The present invention generally relates to image generation systems and methods, in particular, to photographic systems and methods, and, most particularly, to such systems and methods for capturing and distributing images to a customer visiting a location.

BACKGROUND

The sale of photographs taken by a photographer of a customer of, for example, a theme park, cruise, or other event where there are large volumes of people present is known in the art. This system has inherent inefficiencies, in that the photographer typically prints many more photographs than are ultimately sold, and the sale is dependent upon the customer's viewing and agreeing to purchase the photograph displayed after the event, thereby losing any momentum caused by the excitement of the moment.

An additional problem with known systems is that images from certain vantage points, and including objects at a site being visited by the customer, which may comprise, for example, still or video images, are typically not possible when taken by a photographer at a defined location within the site. Thus achieving viable perspectives to capture an image at a site from an optimal vantage point may be impossible for the customer.

Another difficulty is that some sites do not permit photography at all, or may not permit flash photography, owing to security and/or photo-damage concerns. Such prohibitions can prevent the customer from capturing desired images that can comprise priceless memories to him/her.

Further, a customer may desire a photograph to be taken at a time when a photographer is not in the vicinity.

Another particular difficulty with photography in general is that there is no really viable system available wherein the photographer him/herself can be in the picture, nor that person with a group. Personal camera equipment is typically not sufficiently sophisticated to produce a good product, and extra equipment, such as tripods, must be hauled along to accomplish self-photos. In the realm of videography, there is no known way to film oneself when the camera is moving. Further, the technical skill of the individual is typically lacking, and good amateur photographs are rare.

Therefore, it would be desirable to provide systems and methods for more efficiently capturing and delivering photographic and/or video images to a customer. It would also be desirable to provide systems and methods wherein the customer him/herself can be a subject of the image. It would be additionally desirable to provide systems and methods for distributing a collection of images captured at a site.

SUMMARY

The present invention in one aspect is directed to a system and method for capturing a digital image, and preferably a collection of digital images, of a customer in a defined location, such as a museum, a garden, a zoo, a religious institution, a theme park, or any such site known in the art. The system and method provide a customer with a pictorial souvenir of a visit to the site that could not be accomplished by means known in the art. The souvenir can include other elements, such as "stock" images, alone or having had an image of the customer digitally inserted thereinto.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

DETAILED DESCRIPTION OF PREFERRED EMBODIMENTS

Figure 1:
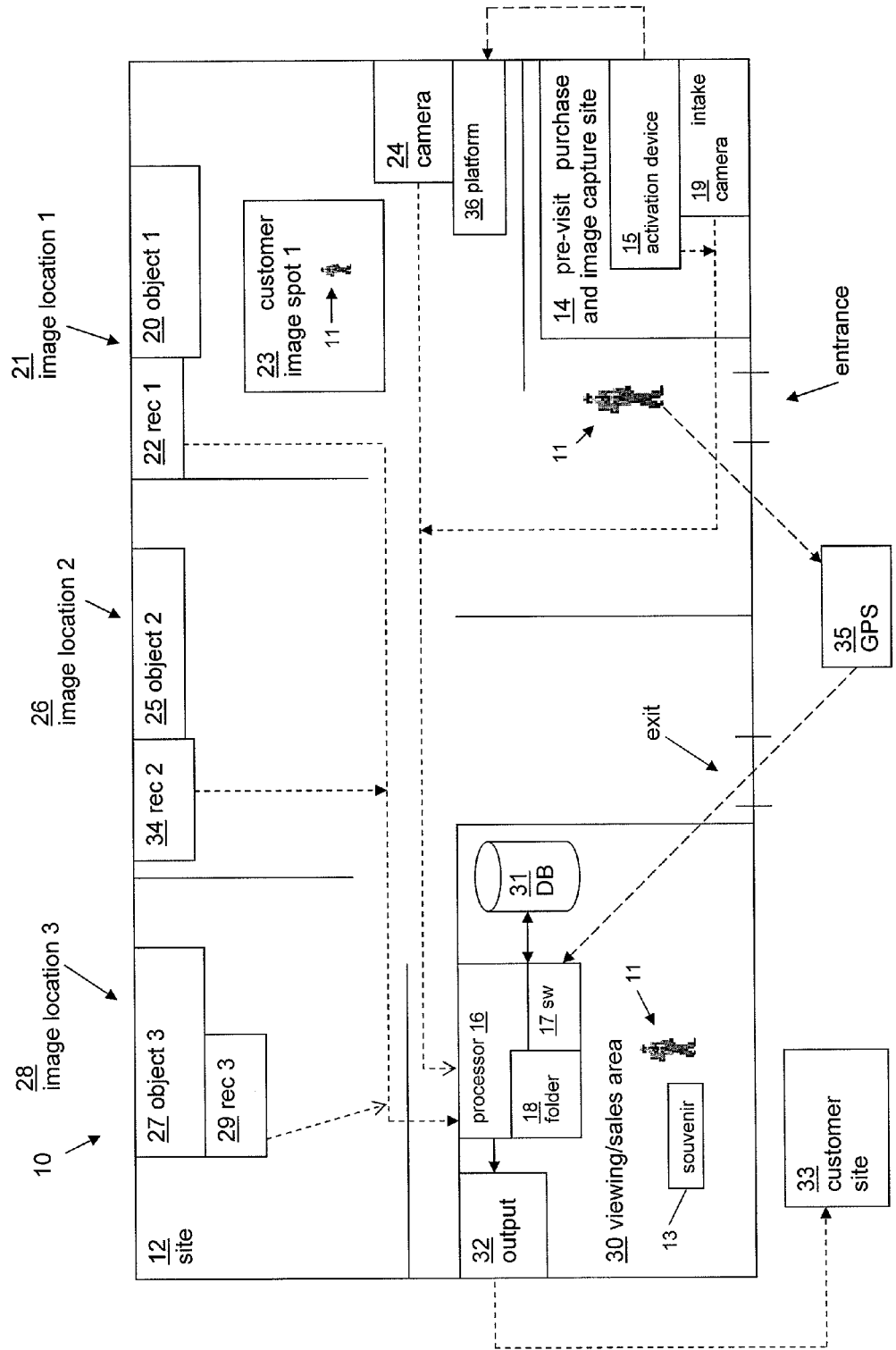
FIG. 1 is a system schematic of an embodiment of an image capture system for use in a defined location.
Figure 2A:
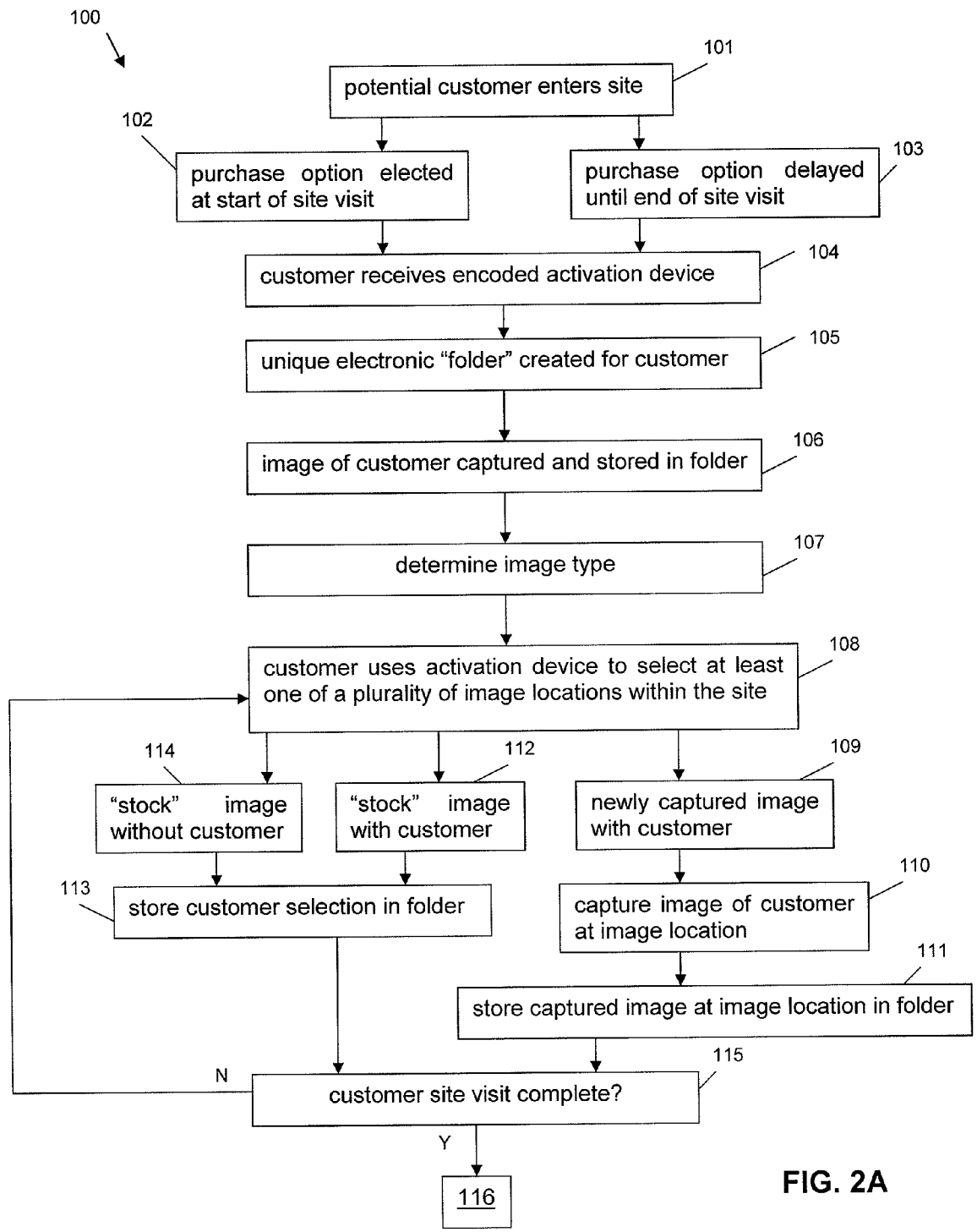
FIGS. 2A-2B is a flowchart of exemplary methods of capturing an image in a defined location.
Figure 2B:
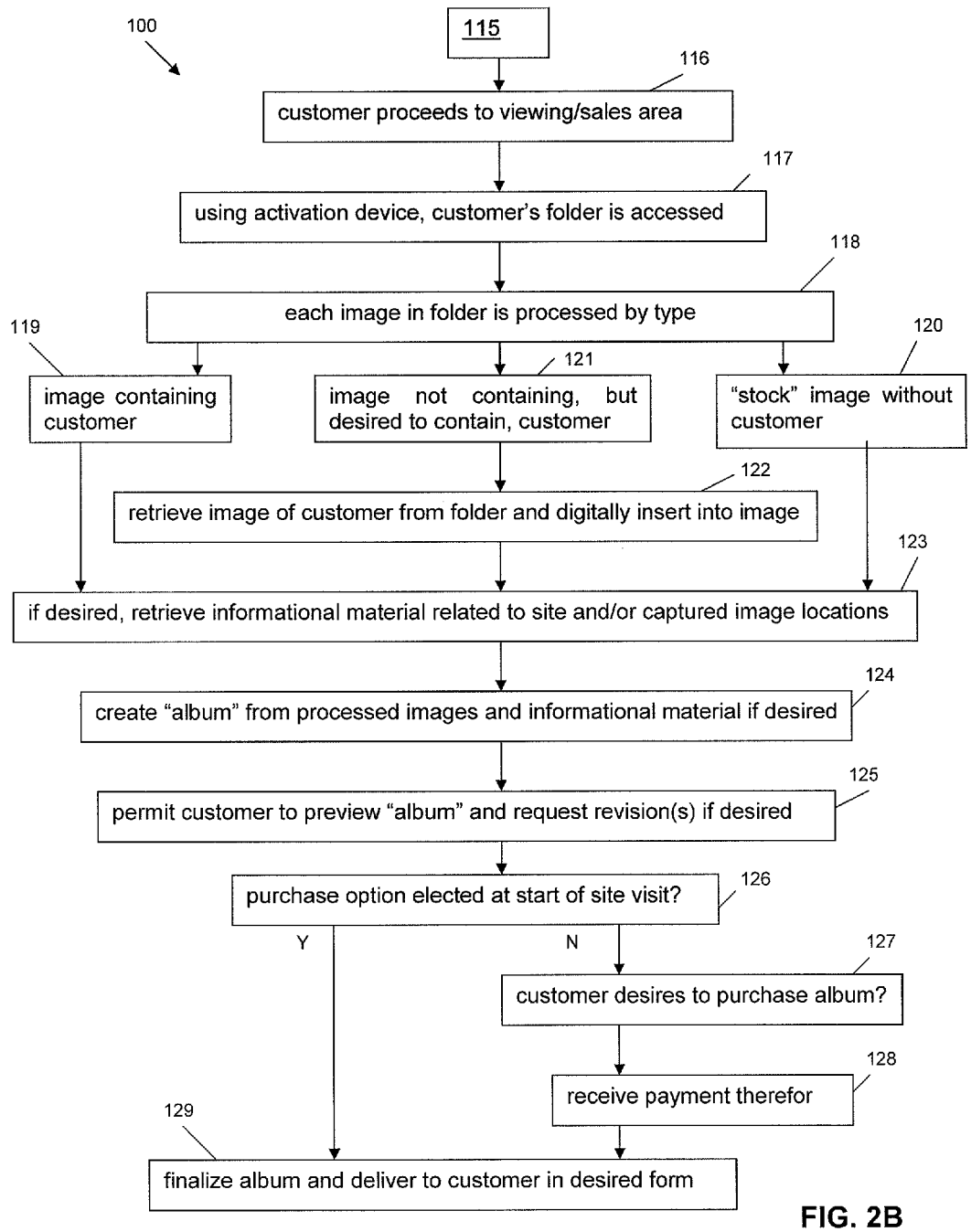

A description of the preferred embodiments of the present invention will now be presented with reference to FIGS. 1-4D.

The present invention in one aspect is directed to a system 10 (FIG. 1) and method 100 (FIGS. 2A,2B) for capturing a digital image of a customer 11 in a defined location. The system 10 and method 100 are preferably for use in a defined location, or site 12, such as, but not intended to be limited to, a museum, a garden, a zoo, a religious institution, a theme park, or any such site known in the art. The system 10 and method 100 provide a customer with a pictorial souvenir 13 of a visit to the site 12 that could not be accomplished by means known in the art. It will be understood by one of skill in the art that the words picture, image, camera, and photograph are not intended to be limited to a particular construction, and that still and moving images and recording devices can be contemplated thereby, and may include other media such as sound.

In a particular embodiment, a potential customer 11 enters a site 12 that has been outfitted with components for creating a pictorial memento 13 of the visit (block 101). The opportunity to purchase this souvenir 13 can be offered to the customer 11 upon entering the site 12, for example, at a pre-visit purchase and image capture site 14, an offer that can be accepted (block 102) or rejected (block 103) by the customer 11. In either case, the customer 11 can be given an encoded activation device 15 (block 104), which can comprise, for example, a card with a readable magnetic stripe such as known in the art. This device can also comprise the customer's cell phone or a remote control device, or any other such device capable of transmitting a signal such as known in the art.

A protocol is established for communication between the activation device 15 and a processor 16, which has software 17 for creating a folder 18 specific to the customer 11 (block 105). In one embodiment, an initial image of the customer 11 can be captured by an intake camera 19 and stored in the folder (block 106), for example, using "green screen" technology so that the customer's image can be embedded subsequently in other images if desired.

As the customer 11 is touring the site 12, s/he may desire to capture an image of and/or with an object at the site 12 (block 107). There are several ways in which this may be accomplished, although these examples are not intended to be limiting. In one case, the customer 11 may desire to be imaged with a first object 20 at a first image location 21 (block 109). The customer 11 uses the activation device 15 to contact a first receiver 22 (block 108), which is in signal communication with the processor 16. A first customer image spot 23 is indicated near the first object 20, and a first image location camera 24 images the customer 11 (block 110) and transmits the image to the processor 16, which stores the image in the customer's folder 18 (block 111).

Another option includes the customer 11 desiring his/her image to be inserted into a scene with a second object 25, for example, at a second location 26 (block 112). Again, the customer 11 uses the activation device 15 to contact a second receiver 34, which communicates the customer's order to the processor 16, which stores the order in the folder 18 (block 113).

A further option includes the customer 11 desiring a reproduction of an image of a third object 27 at a third image location 28, without the customer image therein (block 114). The customer 11 uses the activation device 15 to contact a third receiver 29, which communicates this order to the processor 16, which in turn stores the order in the folder 18 (block 113).

In some embodiments it may be desirable that the camera 24 be placed so as to capture an object that can move, for example, a ride in an amusement park, a performer, or an animal in a zoo. In this case, the camera 24 may be mounted for movement on a platform 36 that can be placed in signal communication with the activation device 15. This configuration would permit the customer 11 to control camera 24 movement to capture a desired object within range of the camera's panning ability.

It will be understood by one of skill in the art that other methods of communication and customer identification can be used. For example, instead of having an activation device 15, one or more forms of biometric identification could inform the system as to the customer's identity, such as, but not intended to be limited to, fingerprint, iris scan, and facial recognition. As facial recognition technology is not yet exact, additional data can be collected to increase the chance that the system will recognize a particular customer, such as searching for a particular item of clothing or color worn by the customer, imaging more than one customer at a time (for example, a companion), or imaging a numerical identifier worn by the customer.

In addition, the location of the customer can be determined "passively," by GPS 35 sensing of the customer's activation device 15. This option also permits the system to sense the customer's location and associate the location with data stored in a database 31 in signal communication with the processor 16.

In another embodiment, the image location 21,26,28 could have signage indicating a telephone number for the customer to call. The system could then use the caller ID from the customer's telephone to associate the customer's folder 18 with the location 21,26,28.

This process can be repeated until the customer's visit is complete (block 115), at which time s/he can proceed to the viewing/sales area 30 (block 116) if desired. Using the activation device 15, the customer's folder 18 is accessed (block 117). Each image and order in the folder 18 is processed according to type (block 118). An image containing a customer 11 is retrieved from the folder 18 (block 119), and a "stock" image without the customer 11 is retrieved from the database 31 (block 120). For those images wherein the customer 11 wishes to be inserted (block 121), the associated "stock" image is retrieved from the database 31, and the customer's image, as taken in step 106, is inserted thereinto digitally (block 122).

The customer 11 can also have the option to have the souvenir 13 enhanced with material stored in the database 31, such as informational textual material and/or additional images (block 123). For example, in a museum, didactic material relating to a particular objet d'art could be inserted. A complete "album" can then be digitally created (block 124), and the customer 11 can preview the album on an output device 32 and request revisions as desired (block 125).

If the souvenir 13 had not been purchased at the start of the visit (block 124), and if the customer 11 wishes to purchase the souvenir 13 (block 127), payment is received (block 128).

The final souvenir 13 is then delivered to the customer 11 in one or more forms known in the art (block 129). For example, the souvenir 13 can take the form of a physical, printed album, which could be printed and bound on site. Alternatively, the souvenir 13 can take the form of a digital record, for example, stored on media. Further, the souvenir 13 can take the form of a digital record transmitted to the customer 11 at a desired site 33. The digital media and record can contain both still and moving images as desired.

The final souvenir 13 can comprise multiple forms and components as desired. For example, an album could include material suitable for entertaining children, such as a coloring book, which would serve the purpose of being both amusing and educational.

Further, some of the cost of producing the souvenir 13 can be defrayed by including advertising. The advertising could be "stock," that is, directly related to the site itself or the surrounding area (local restaurants, shops, etc.). Alternatively, the advertising could be targeted to the customer from data gleaned on customer demographics and customer preferences, as determined by the software 17 from the material selected by the customer. For example, if the customer is in a museum with dissimilar items, but the customer gravitates to a particular type of display (e.g., medieval art, Civil War, etc.), correlations can be made as to vendors and merchandise that might appeal to the customer. Such preferences can then be used, not only to select advertising to appear in the souvenir 13, but also for subsequent marketing opportunities to the customer via, for example, email or direct mail marketing campaigns.

Figure 3:
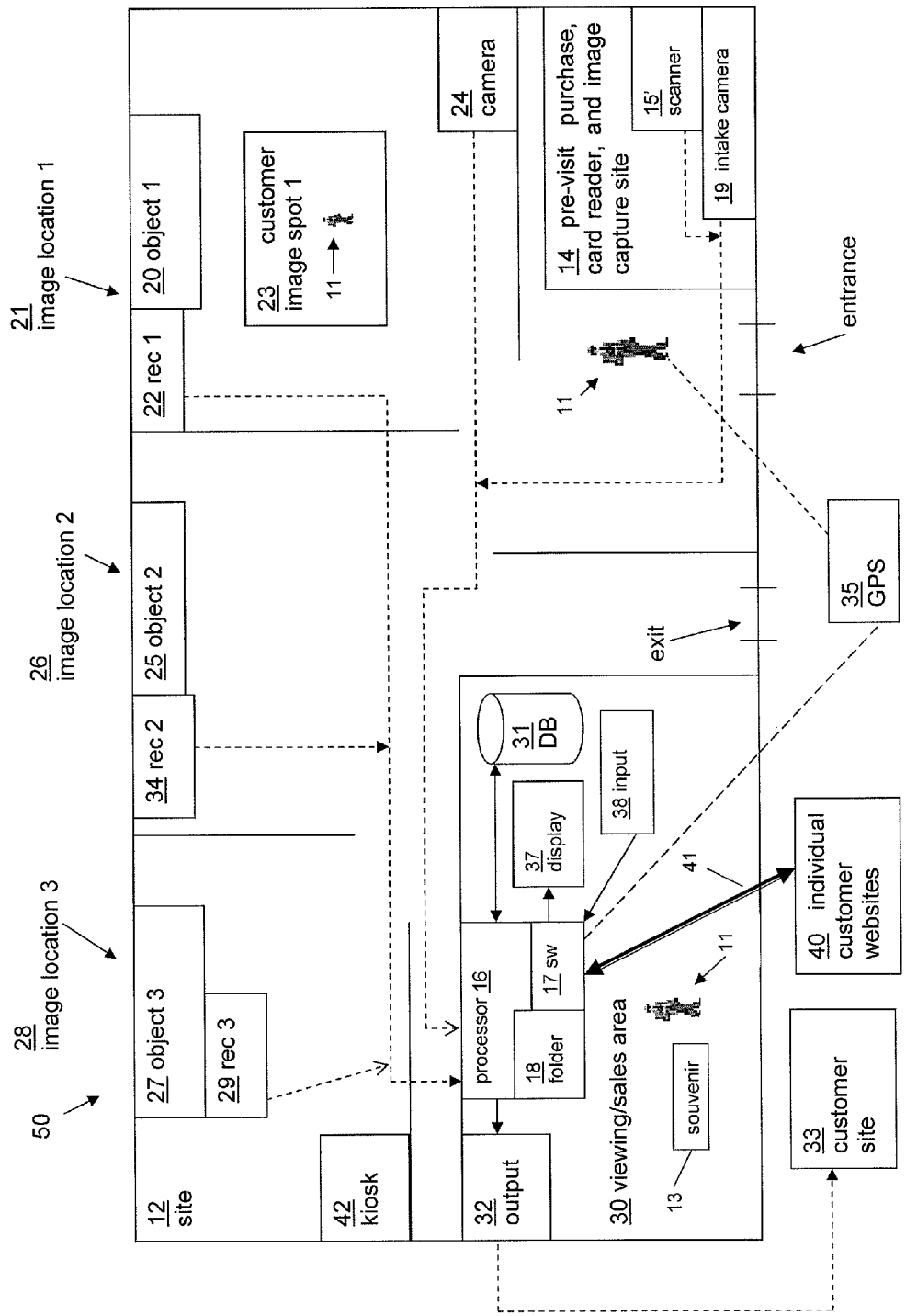
FIG. 3 is a system schematic of another embodiment of an image capture system.
Figure 4A:
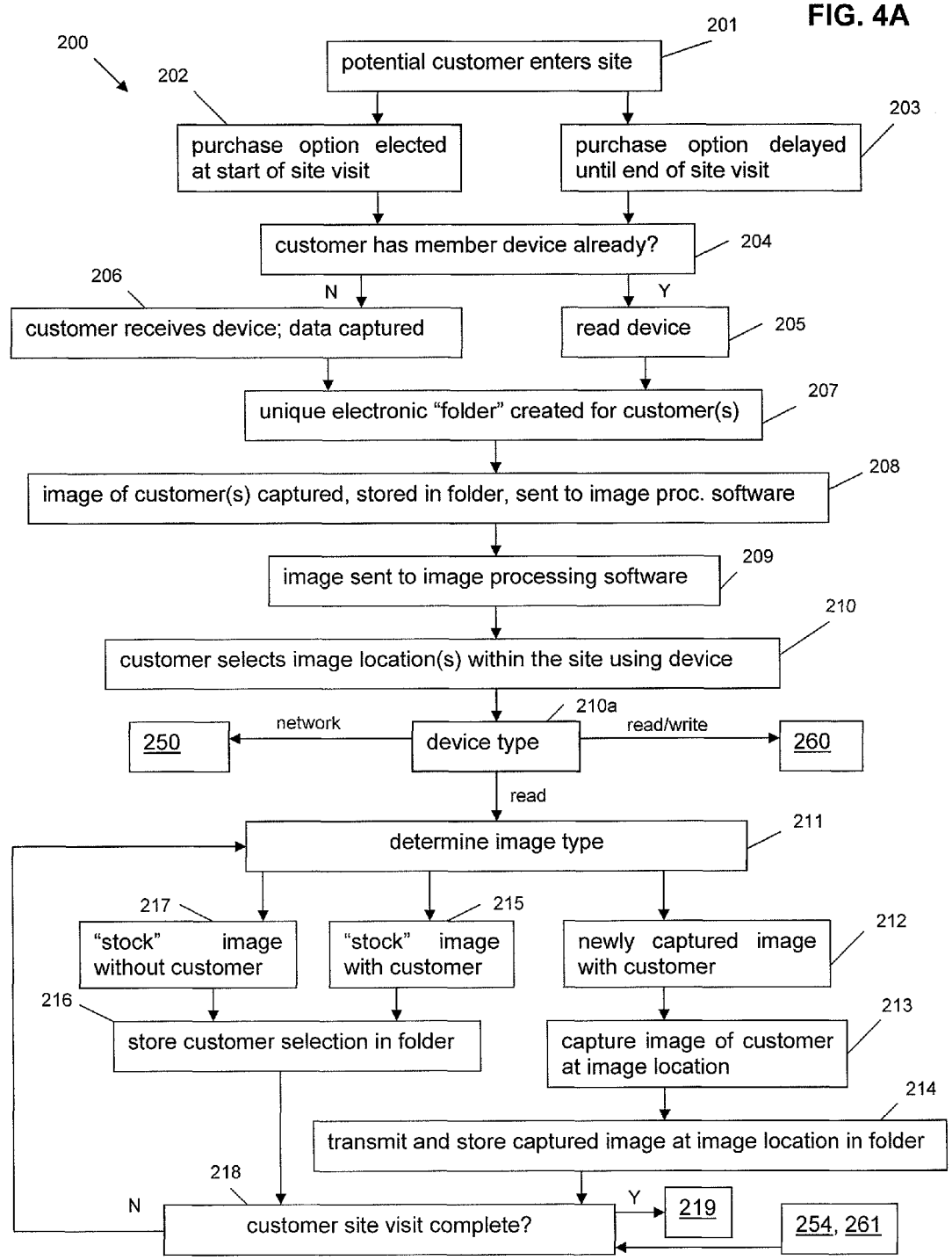
FIGS. 4A-4D is a flowchart of another exemplary method of capturing an image in a defined location.
Figure 4B:
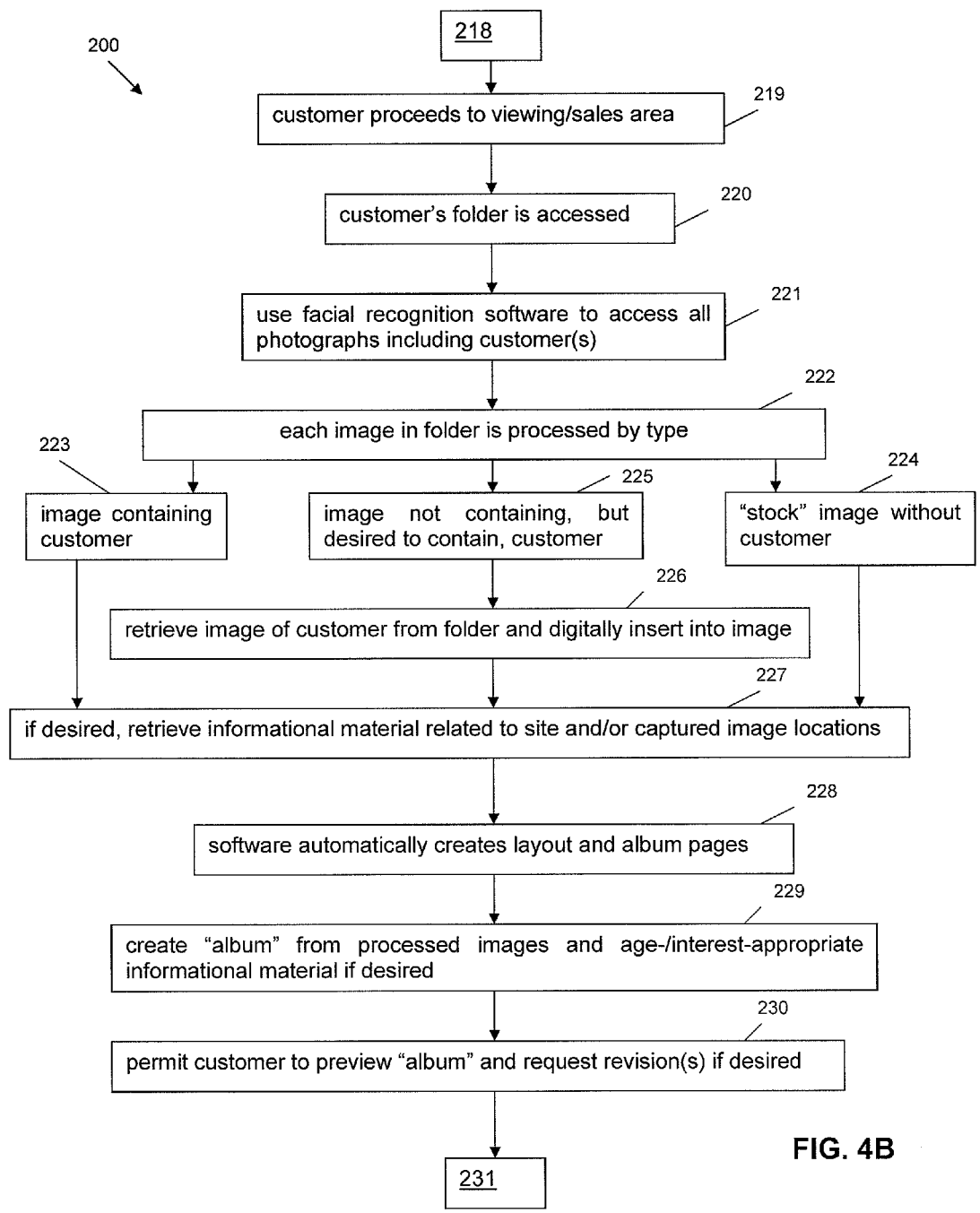
Figure 4C:
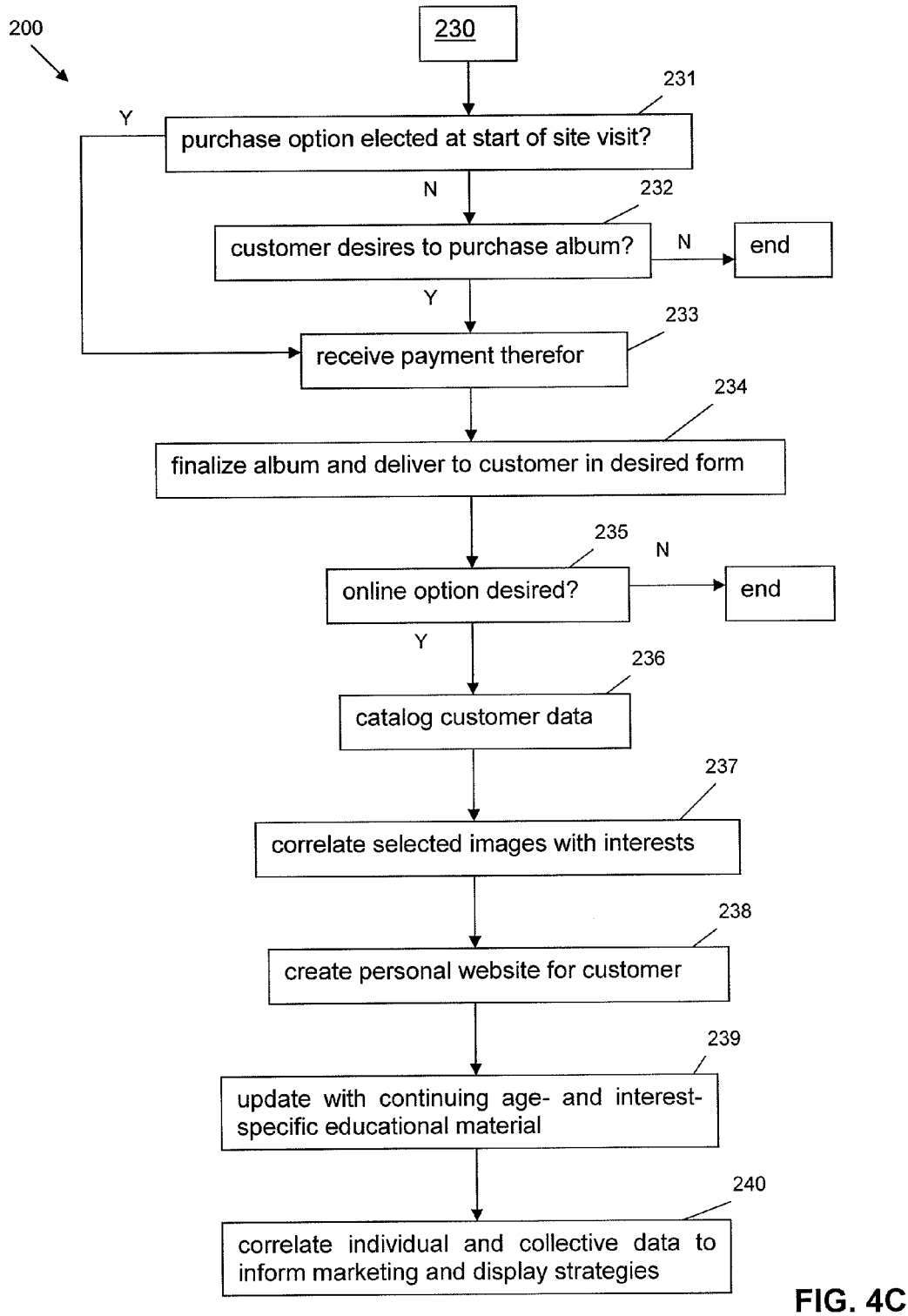
Figure 4D:
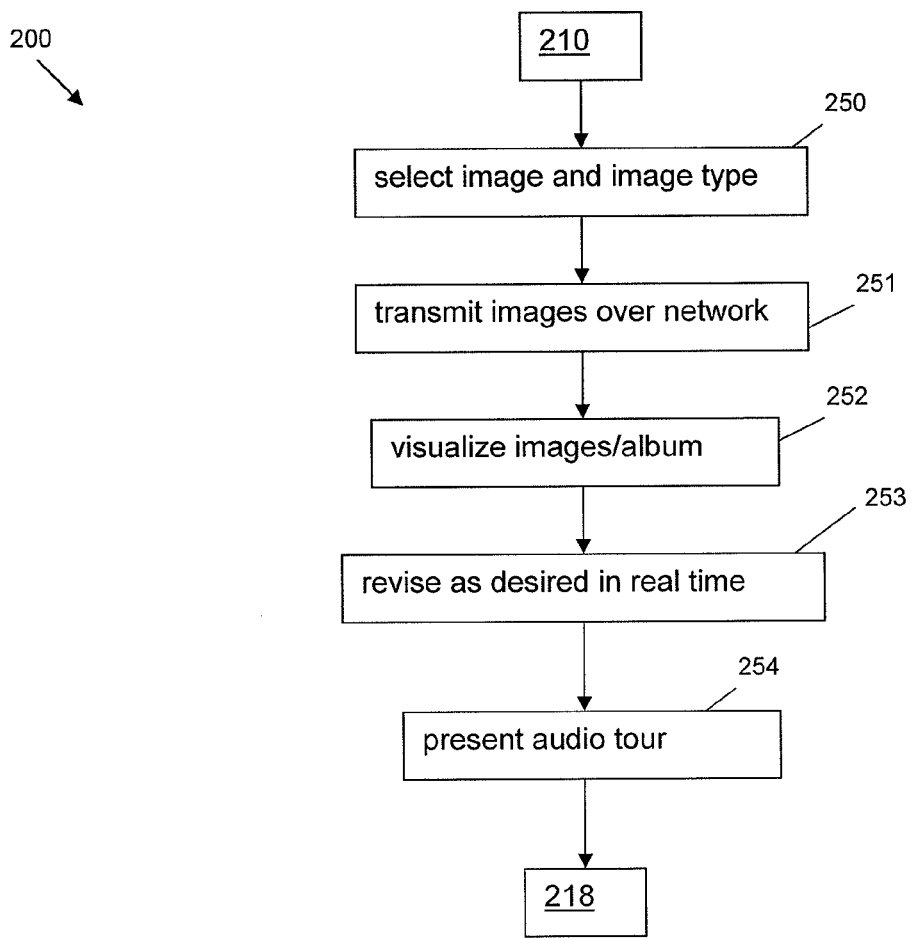
Figure 4D:
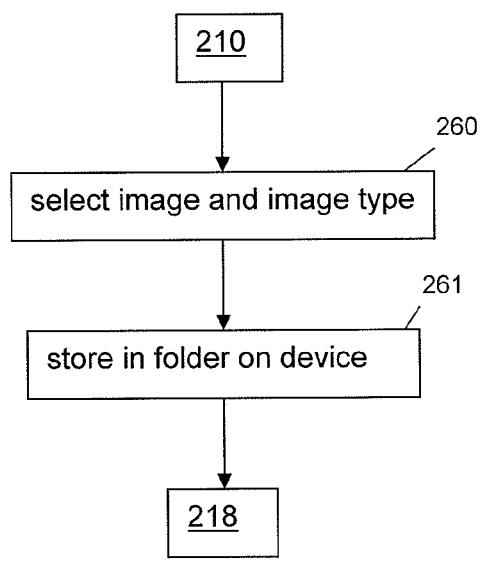

In another embodiment a system 50 (FIG. 3) and method 200 (FIGS. 4A-4C) are provided that can embrace additional features. FIG. 3 is a system schematic that incorporates similar elements as in FIG. 1 discussed above, with common numerals indicative of common elements.

In this embodiment 50,200, a potential customer 11 enters the site 12 that has a membership option (block 201). The opportunity to purchase a souvenir 13 can be offered to the customer 11 upon entering the site 12, as above, an offer that can be accepted (block 202) or rejected (block 203) by the customer 11. The customer 11 is queried as to whether s/he is already a member (block 204). If so, the customer's membership card or other device is read, for example, by scanning 15' (block 205); otherwise, the customer receives a device such as a scannable card, and the customer's pertinent data are captured (block 206), which can include a photograph/image in some embodiments, and also can include data such as age, which will be used as a basis upon which to include such material as informational narrative. The word "card" is being used herein without limitation, and one of skill in the art will appreciate that any device that can communicate in such a way as to identify the user is intended to be subsumed herein. For example, a read-only or a read/write card could be used, with a magnetic strip such as known in the art. Further "smart" devices such as cellular telephones and media playing devices can also be used.

The software 17 creates a folder 18 specific to the customer 11 (block 207). An image of the customer 11, which can comprise an image of the customer with those accompanying him/her, can be captured by the intake camera 19 and stored in the folder (block 208) and also sent to image-processing software (block 209).

As the customer 11 is touring the site 12, s/he may indicate a desire to capture an image of and/or with an object at the site 12 with the device (block 210). The selection and communication procedure can then proceed in at least two ways, which is determined by the type of device being used (block 210a) and the site configuration (block 211). For example, for a device that does not have "write" capabilities, the following steps are taken.

There are several ways in which the device may be used, although these examples are not intended to be limiting. In one case, the customer 11 may desire to be imaged with a first object 20 at a first image location 21 (block 212). The customer 11 uses his/her device to contact a first receiver 22, which is in signal communication with the processor 16. A first customer image spot 23 is indicated near the first object 20, which can be accomplished with visual means such as known in the art. Visual and/or audio means can also be used to "count down" until the shot is taken. A first image location camera 24 images the customer 11 (block 213) and transmits the image to the processor 16, which stores the image in the customer's folder 18 (block 214).

Another option includes the customer 11 desiring his/her image to be inserted into a scene with a second object 25, for example, at a second location 26 (block 215). Again, the customer 11 uses the device to contact a second receiver 34, which communicates the customer's order to the processor 16, which stores the order in the folder 18 (block 216).

A further option includes the customer 11 desiring a reproduction of an image of a third object 27 at a third image location 28, without the customer image therein (block 217). The customer 11 uses the device to contact a third receiver 29, which communicates this order to the processor 16, which in turn stores the order in the folder 18 (block 216).

In some large installations, particularly those that can become crowded, it may be difficult to approach certain popular objects. In such cases, a multi-purpose kiosk 42 having interactivity, via, for example, a touch screen, could be provided wherein a plurality of images of objects in the installation could be displayed, from which the user could select one or more images for inclusion in his/her folder. Such a kiosk 42 could also be used to view the customer's folder in progress.

Returning to block 210, in some cases a device may be used that is in signal communication with the processor 16. An image is selected as above in blocks 211-217 (block 250). In addition, in such a case the software 17 can be used to transmit images over a network (block 251) so that the customer 11 can visualize the images as they could appear in a finished souvenir product (block 252), and thereby modify selections and captured images in "real time" if desired, which can include re-taking the image (block 253). Also, if desired, such a device can be used to present an audio and/or visual tour (block 254) through the site 12. This device could also be used in other ways known in the art, especially as such devices evolve, such as providing information on using the system 50, instructions on where to stand to have an image taken, how far along the customer is on the tour, etc. These examples are not intended to be limiting, and one of skill in the art will appreciate that such devices can be used in a myriad of ways interactively with the customer and the system.

Again returning to block 210, another process can be used to select images, if the device has read/write capabilities. This device can be used to store data instead of transmitting the data to the processor 16 during the customer's travels through the site 12.

In this embodiment, the customer 11 selects an image type as above in blocks 211-217 (block 260). An image identifier and the selected image type are then stored in a folder on the device (block 261).

The viewing and selection processes can be repeated until the customer's visit is complete (block 218), at which time s/he can proceed to the viewing/sales area 30 (block 219) if desired. Using the device, the customer's folder 18 is accessed, whether from the processor 16 or the device (block 220). Either the stored information or facial recognition software can be used to access all photographs having been taken that include the customer 11 (block 221). A benefit of having used multiple people in the customer image is that additional faces can aid in increasing the probability that the correct customer has been identified by a significant degree. For example, at present facial recognition software is known to be 70-80% accurate, whereas the addition of other data, such as other faces, clothing color, etc., can bring the probability close to 100%.

Each image and order in the folder 18 is processed according to type (block 222). An image containing a customer 11 is retrieved from the folder 18 (block 223), and a "stock" image without the customer 11 is retrieved from the database 31 (block 224). For those images wherein the customer 11 wishes to be inserted (block 225), the associated "stock" image is retrieved from the database 31, and the customer's image, as taken in step 208, is inserted thereinto digitally using techniques known in the art such as background replacement (block 226).

The customer 11 can also have the option to have the souvenir 13 enhanced with material stored in the database 31, such as age-appropriate informational textual material and/or additional images (block 227). For example, in a museum, didactic material relating to a particular objet d'art could be inserted.

Once the image collection is complete, the software 17 can be used to begin to create the customer's "album." If the album is to be a physical object, there will typically be size limitations. The software 17 has a module for creating album pages automatically (block 228), making determinations as to page layout and relative size of images, for example. The software 17 can also select a layout and graphics based upon the customer's age. A complete "album" can then be digitally created (block 229), and the customer 11 can preview the album on a display 37 and request revisions as desired, which can be entered via an input device 38 (block 230). The "album" can be in any form known in the art. If a DVD-type souvenir is selected, stock video clips could form part of the souvenir 13.

If the souvenir 13 had not been purchased at the start of the visit (block 231), and if the customer 11 wishes to purchase the souvenir 13 (block 232), payment is received (block 233).

The final souvenir 13 can be delivered to the customer 11 in one or more forms known in the art (block 234), as discussed above.

In addition to, or instead of, a physical souvenir 13, an online option can be selected (block 235). If so, the customer data are cataloged (block 236). The images selected are correlated to determine the customer's interests (block 237). Then a person website 40 can be created for the customer 11 (block 238), which can be updated periodically with continuing age- and interest-specific educational and informational materials (block 239), and is accessible over the internet 41.

The many advantages offered by the systems 10,50 and methods 100,200 of the present invention will be understood by one of skill in the art. The customer 11 receives a professionally imaged and assembled souvenir 13 containing images typically not possible to be achieved by the customer 11 him/herself, whether owing to perspective, vantage point, or quality, and retain all the pleasures of the visit without having to take photographs him/herself. Professional photographers are not required, since the cameras will have been set to take an optimal image, and all else is automated. "Stock" images will have been taken and stored under ideal conditions of lighting and vantage point, thereby minimizing the chance of causing damage to the objects by excess light.

Additionally, the interactivity of the systems 10,50 and methods 100,200 enable data to be collected on customers 11 as to their preferences individually and collectively, which can be used to inform subsequent marketing and display strategies (block 240), including providing suggestions to the customer 11 as to other attractions that might be of interest, based upon the customer's stored preferences.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

What is claimed is:

1. A method of providing a customized pictorial souvenir to a customer visiting a site, comprising:
   receiving, at a computer processor, customer signals from a customer activation device, which customer signals are generated in response to deliberate actions by the customer other than mere movement of the customer to specified areas at the site;
   said customer signals being indicative of requests by the customer to have images taken of specified locations at the site;
   taking the requested images using automated cameras that are coupled with said computer processor and are activated thereby in response to said customer signals;
   wherein at least some of the requested images include images showing the customer at some of said locations;
   creating an electronic folder for the customer using said computer processor;
   storing said images in the customer's electronic folder;
   electronically forming, through use of said computer processor, a customized souvenir for the customer;
   wherein said forming comprises including in the souvenir only those from the customer's folder that the customer has selected for inclusion in the souvenir through selection information that the customer has provided to the computer processor; and
   delivering said pictorial souvenir to the customer.

2. The method of claim 1, further including sending images from the customer folder to the customer's activation device over a network thereby enabling the customer to visualize the sent images and revise as desired in real time.

3. The method of claim 1, further including sending at least some of said images to the customer activation device for viewing by the customer, and re-taking one or more of said images with said automated cameras in response to customer signals sent to the computer processor to request said re-taking, and including the re-taken images in the customer folder.

4. The method of claim 1, further including presenting an audio and/or visual tour information to the customer through the customer activation device.

5. The method of claim 1, further comprising sending to the customer activation device information regarding a count down until an image is taken at one of said locations in response to customer signals requesting the taking of the image.

6. The method of claim 1 in which said deliveries corn irises creatin the customer that contains the pictorial souvenir in electronic form and is accessible over the Internet.

7. The method of claim 1, further comprising including providing a database of stock images and inserting customer-selected stock images into said folder.

8. The method of claim 1, further including inserting into said pictorial souvenir images of objects that the customer selects, which images of objects do not include the customer.

9. The method of claim 1, in which said pictorial souvenir is enhanced with textual material.

10. The method of claim 1, further including inserting in said pictorial souvenir advertising material targeted to the customer from data gleaned on the customer demographics and customer preferences as determined by said computer processor from material selected by the customer.

11. The method of claim 1, in which the customer is identified through biometric data automatically taken of the customer at one or more of said locations at the site.

12. A system providing a customized pictorial souvenir to a customer visiting a site, comprising:
   a customer activation device and a computer processor configured to receive customer signals from the customer activation device, which customer signals are generated in response to deliberate actions by the customer other than mere movement of the customer to specified areas at the site;
   said customer signals being indicative of requests by the customer to have images taken of specified locations at the site;
   automated cameras coupled with the computer processor and configured to take the requested images in response to said customer signals;
   wherein at least some of the requested images include images showing the customer at some of said locations;
   said computer processor being further configured to create an electronic folder for the customer and to store said images in the customer's electronic folder;
   said computer processor being further configured to form a customized souvenir for the customer by including in the souvenir only those images from the customer's folder that the customer has selected for inclusion in the souvenir through selection information that the customer has provided to the computer processor; and said computer processor being further configured to cause said pictorial souvenir to be delivered to the customer.

13. The system of claim 12, in which said computer processor is further configured to send images from the customer folder to the customer's activation device over a network, thereby enabling the customer to visualize the sent images and revise as desired in real time.

14. The system of claim 12, in which said computer processor is further configured to send at least some of said images to the customer activation device for viewing by the customer, and to respond to customer signals requesting re-taking one or more of said images with said automated cameras to cause the cameras to re-take images as requested and to include the re-taken images in the customer folder.

15. The system of claim 12, in which said computer processor is further configured to present an audio and/or visual tour information to the customer through the customer activation device.

16. The system of claim 12, in which said computer processor is further configured to send to the customer activation device information regarding a count down until an image is taken at one of said locations in respond to customer signals requesting the taking of the image.

17. The system of claim 12, in which said computer processor is further configured to create a website for the customer that contains the pictorial souvenir in electronic form and is accessible over the Internet.

18. The system of claim 12, in which said computer processor is further configured to provide a database of stock images and to insert customer-selected stock images into said folder.

19. The system of claim 12, in which said computer processor is further configured to insert into said pictorial souvenir images of objects that the customer selects, which images of objects do not include the customer.

20. The system of claim 12 in which said computer processor is further configured to enhance said pictorial souvenir with textual material.

21. The system of claim 12, in which said computer processor is further configured to insert in said pictorial souvenir advertising material targeted to the customer from data gleaned on the customer demographics and customer preferences as determined from material selected by the customer.

22. The system of claim 12, in which said computer processor is further configured to identify the customer through biometric data automatically taken of the customer at one or more of said locations at the site.

* * * * *